United States Patent [19]

Mohrman

[11] Patent Number: 4,999,857
[45] Date of Patent: Mar. 19, 1991

[54] TOILET SEWAGE TREATMENT UNIT

[76] Inventor: John H. Mohrman, Willow St., P.O. Box 280, Middleport, Pa. 17953

[21] Appl. No.: 347,166

[22] Filed: May 3, 1989

[51] Int. Cl.$^5$ ............................................. A47K 11/02
[52] U.S. Cl. ...................................... 4/111.1; 4/111.4; 4/111.3; 4/111.5; 4/111.6; 4/319; 4/321
[58] Field of Search ............................. 4/111.1–111.5, 4/300, 319

[56] References Cited

U.S. PATENT DOCUMENTS

| | | | |
|---|---|---|---|
| 2,995,097 | 8/1961 | Kruckberg et al. | 4/111.2 |
| 3,522,613 | 8/1970 | Botsford | 4/111.2 |
| 3,733,617 | 5/1973 | Bennett | 4/111.1 X |
| 3,956,126 | 5/1976 | Streebin et al. | 4/111.2 X |
| 4,161,792 | 7/1979 | Dallen et al. | 4/111.1 |
| 4,359,789 | 11/1982 | Roberts | 4/111.1 X |
| 4,546,502 | 10/1985 | Lew | 4/111.1 X |

Primary Examiner—Henry K. Artis

[57] ABSTRACT

This invention relates to a sewage waste disposal system for receiving liquid and solid waste, preferably human waste. The waste is heat treated to produce a form of dehydrated solid waste. The solid waste is a waste by-product of the system and may be used as a fertilizer. The system encompasses the use of a trapless toilet bowl which includes a toilet seat and lid and has the appearance of a conventional toilet arrangement for greater public acceptance.

11 Claims, 5 Drawing Sheets

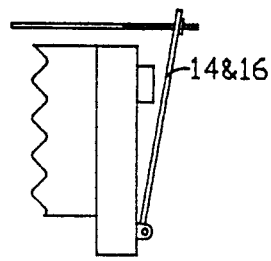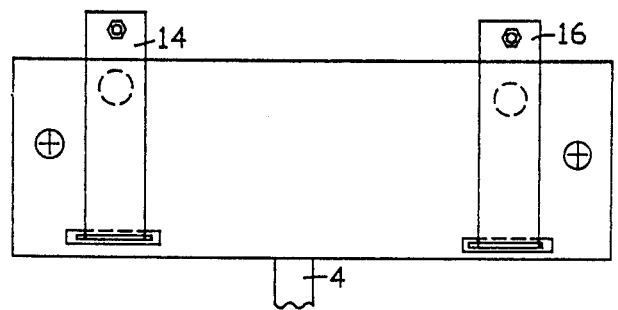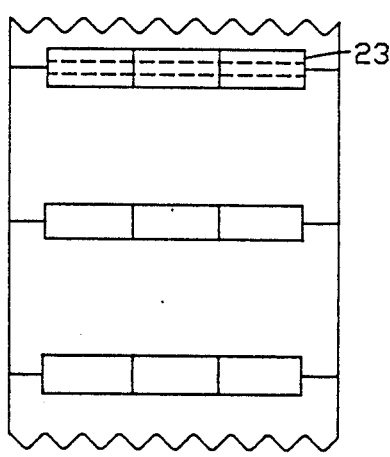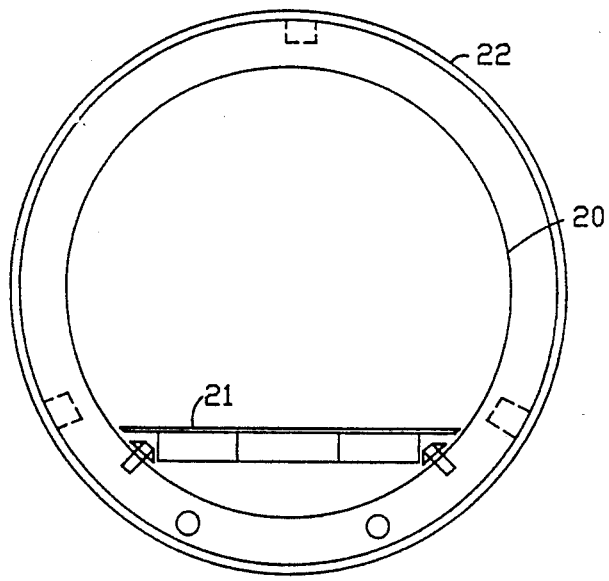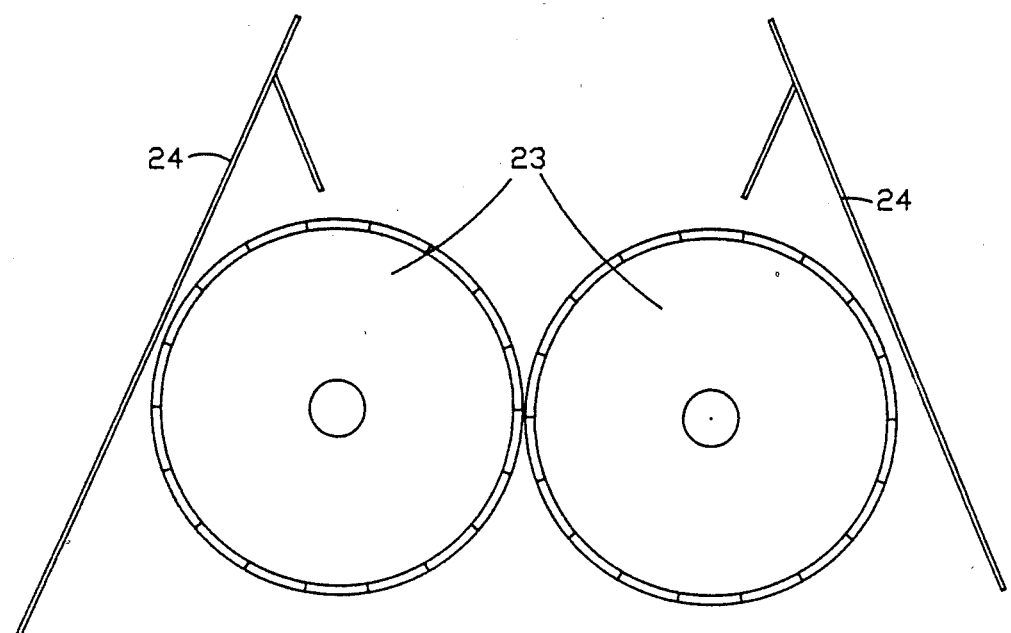
FIG. 4
FIG. 5
FIG. 6
FIG. 7
FIG. 8

TOILET SEWAGE TREATMENT UNIT

The conventional water toilet has been used as the primary method for disposing of human waste as mankind developed technological progress to provide a cleaner method for such disposal. The water toilet served that purpose until mankind realized that although it provided an indoor convenience not previously experienced, the water toilet combining water with the human waste generated voluminous liquid sewage problems. The population growth continued to elevate the severity of the problem on the health and welfare of society. Subsequently the technology applied to finding solutions to that problem evolved into holding tanks, septic systems, central treatment systems all of which have proven to be inadequate. Pollution of rivers and streams and saturation of major ground areas have become rampant with continued use of the water toilet and current methods attempting to treat and dispose of the sewage.

Society has become so habitually accustomed to the convenience and comfort of using the conventional water toilet that any drastic technological departure affecting such use would not be acceptable. Government of all levels have attempted to cope with the massive problem of increasing water usage along with the increasing sewage treatment problem with little or no success. Many attempts have been made in the past to develop the technology to minimize or eliminate water usage and treat sewage at the source with minimal success. Devices developed to compost, incinerate, recycle or even elaborately process sewage at the source where it is generated have not been acceptable substitutes for the water toilet that society has become so accustomed to using. In particular those sewage processing systems that incinerate the waste exhaust more toxic air contaminants than other processing systems. Also an assumption is made in the development of some devices that electrical power would not be available. Only the most remote locations in the present society are without centrally provided electric power systems. Portable power plants nullify the assumption that electrical power would not be available. Attempts to provide toilet bowl receptacles without the use of water or by water sprays through coating the bowl surface with various substances to keep the bowl clean have proven to be unsuccessful. The only man made substance that has proven to resist all chemical actions in the past is porcelain surface coated toilet bowls. All toilet bowls need to use water delivered in absolute minimum amounts to keep the bowl clean. Society will not accept and use a toilet bowl that requires specific detailed instructions to operate and maintain. The toilet technology currently available will not meet the criteria of operation applied to the conventional water toilet.

The primary object of this invention is to provide a toilet that duplicates to the maximum extent possible the user operation of the present water toilet while using minimum water to clean the bowl as clean as the current water toilet.

A further object of this invention is to provide a toilet sewage treatment unit that is self-contained as a unit.

A further object of this invention is to provide a toilet unit that uses water in a pulsating manner to maintain cleanliness of the bowl thereby keeping water volume usage to an absolute minmum.

Yet another object of this invention is to provide a toilet unit that produces an end product that is useful and easy to handle and is sterile and dehydrated.

Still another object of this invention is to provide a toilet unit that is simple and safe to operate.

These and other objects of the invention will become clear as the description thereof continues.

Further objects and advantages of the invention will become apparent with greater clarity and specificity by referring to the following figures:

FIG. 4 is a schematic showing electrical controls of the present invention.

FIG. 5 is a schematic illustrating electrical controls of the present invention.

FIG. 6 is a sectional schematic of the conveyor belt of the present invention.

FIG. 7 is a sectional schematic illustrating the conveyor and heat chamber of the invention.

FIG. 8 is a schematic of the product crushing element of the invention.

Briefly stated the present embodiment is an invention consisting of a modified conventional water toilet bowl with hinged seat and lid attached to a closed compact unit for the treatment of sewage and other food waste to produce a usable end product.

Figure 1:
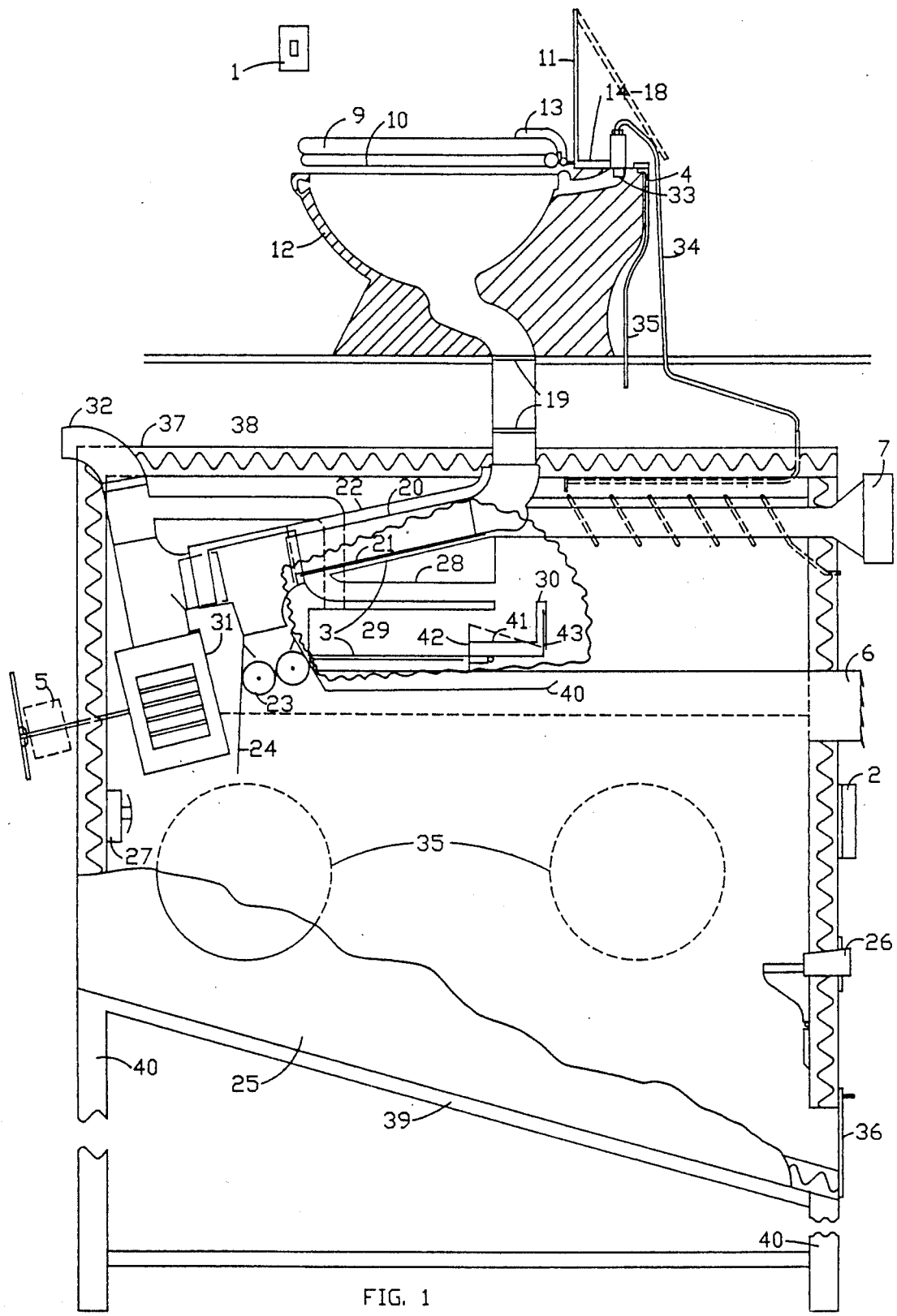
FIG. 1 is cross sectional side view of the present invention that illustrates the embodiment of the complete unit that operates with electricity.
Figure 3:
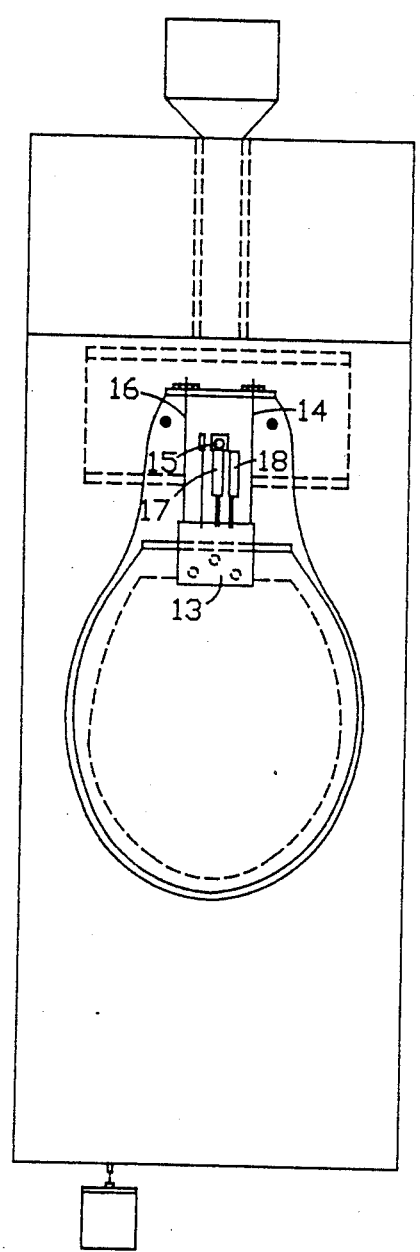
FIG. 3 is a plan schematic showing operating characteristics of the toilet bowl of the present invention.
Figure 2:
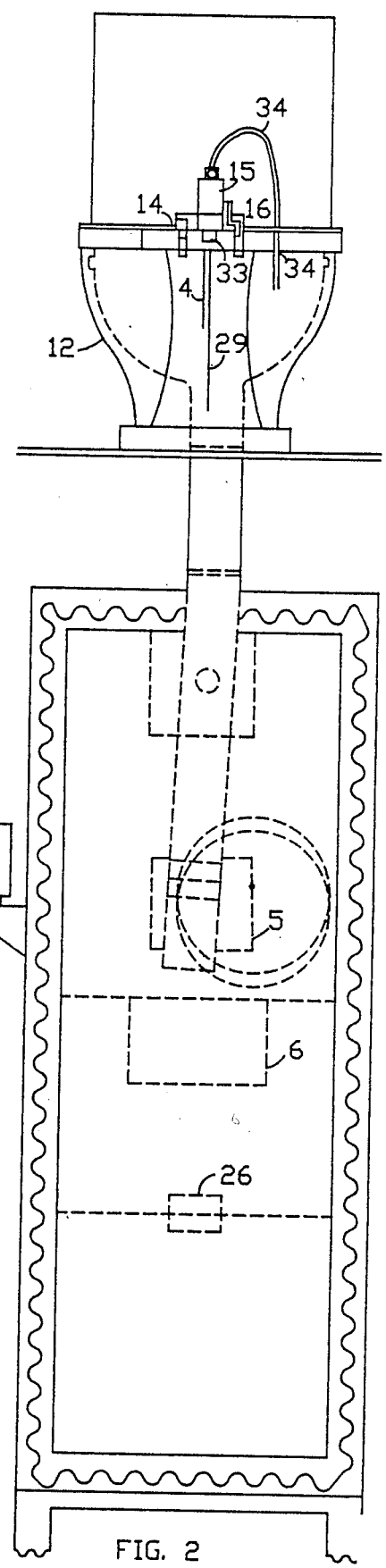
FIG. 2 is a cross sectional rear view of the invention depicting essential design characteristics.
Figure 9:
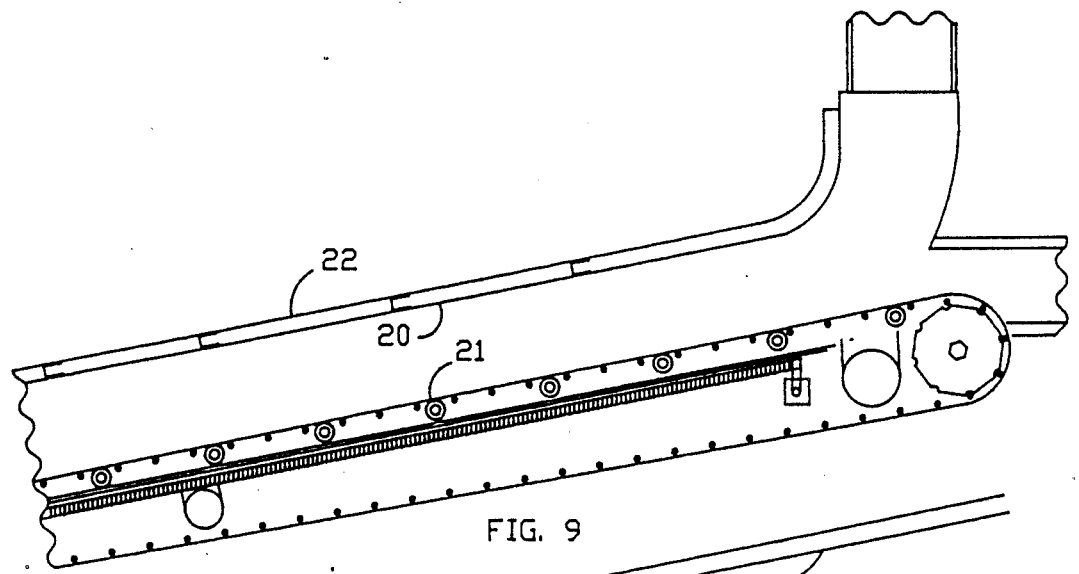
FIG. 9 is a sectional schematic of the side of the conveyor and insulated heat chamber.
Figure 10:
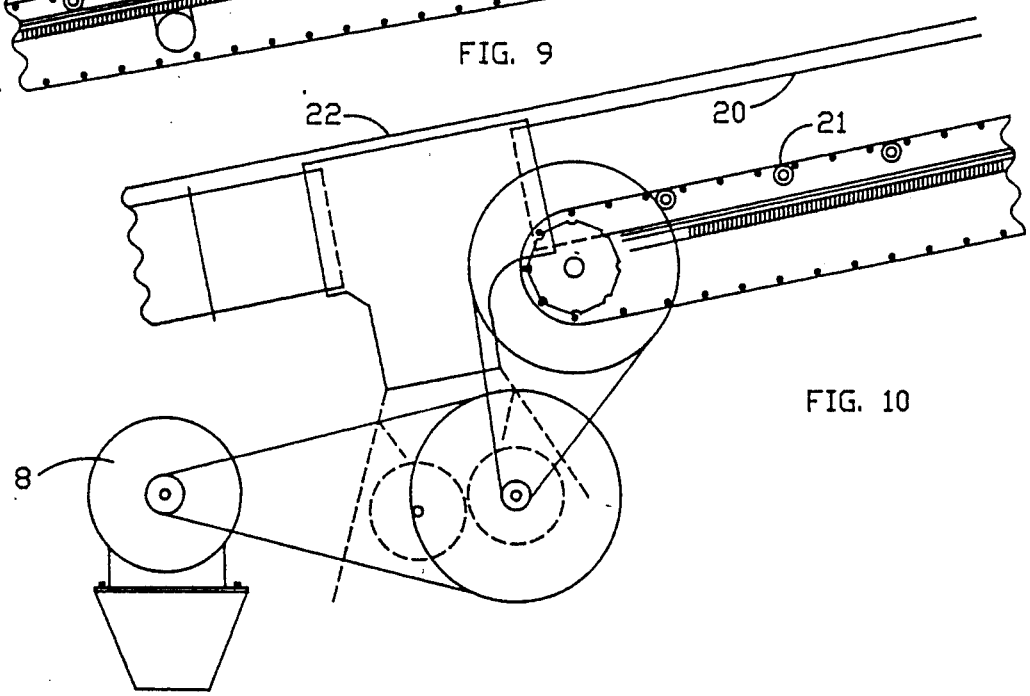
FIG. 10 is a sectional side of the present invention depicting the electrical powered product crushing and conveyor components of the present invention.

In FIG. 1 the schematic drawing shows the arrangement of the components and principles of operation of an embodiment of the invention that is suitable for installation in facilities at any location having electrical power. The principle components comprising the toilet sewage treatment unit shown in FIG. 1 are a modified conventional water toilet 12 in which the waste is deposited. The modified toilet 12 has a seat 10 and lid 9 both of which are equipped with a vinyl gasket air seal to prevent odors from escaping from the toilet. The toilet lid 9 is equipped with a plastic molded attachment 13 that is connected to elements shown in FIG. 2 and FIG. 3. Referring to FIGS. 1, 2 and 3, electric current to the entire unit is controlled by power source switch 1. A power control switch 14 activates the processing system when the toilet lid 9 is raised. Lock means 16 prevents opening of the toilet lid when the power source switch 1 is in the off position. FIGS. 4 and 5 illustrate details of the elements of FIGS. 2 and 3. A pulsating water valve 15 with a water feed line that is opened when the toilet seat is raised, cleans the toilet bowl.

Pneumatic closers 17 and 18 are attached to the toilet seat 10 and toilet lid 9 respectively, to prevent the seat and lid from remaining open when the toilet bowl is not in use. The toilet unit is further characterized by the respective inclusion of a back rest and cover 11 to conceal the control elements as shown in FIG. 1.

Figure 11:
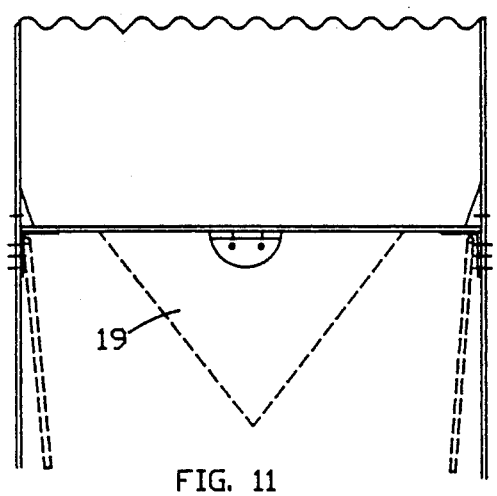
FIG. 11 is a schematic of the spring loaded air lock valve of the present invention.
Figure 12:
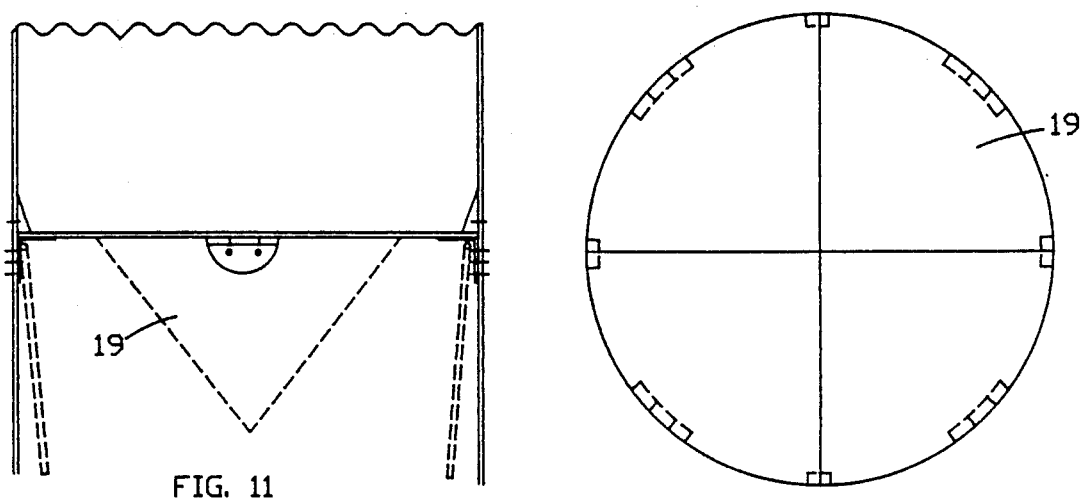
FIG. 12 is a plan schematic of the spring loaded air lock valve of the present invention.

As further shown in FIG. 1, waste deposited in the toilet bowl 12 is washed down pass spring loaded air lock valves 19, shown in detail is FIGS. 11 and 12, and deposited on the moving conveyer 21 powered by electric motor 8, shown in detail in FIGS. 6, 7, 9 and 10. A circular heat chamber 20 is enveloped by a circular heat shield 22. A first thermostatically controlled heating coil 3 is positioned under the heat chamber 20 for supplying heat thereto. A thermostatically controlled heater fan 7 circulates heated air throughout the heat chamber to thereby expedite dehydration of the waste. Inlet 28 is positioned and arranged to feed into a liquid-sludge processing tank or storage bin 29 wherein the liquid from the liquid-sludge waste received therein from the heat chamber 20 is evaporated as a result of the application of the heat from a second thermostatically controlled heating coil 3. The liquid waste leaves the liquid processing tank via the exhaust conduit 32. A duct fan 31, driven by motor 5, functions to move the evaporated liquid by suction to the outside atmosphere at 32. Moreover, any evaporation occurring in the heat chamber 20 is also exhusted to the atmosphere at 32 by way of duct fan 31. Hence, any waste moving through the heat chamber 20 enters the crushing element 23 in at least a partially dry state. The crushed waste is prevented from entering the exhaust area by baffle plate 24 by directing the waste away from the exhaust area and into the storage bin 25, after additional treatment in a liquid-sludge processing tank. Once in the storage bin 25, the waste is kept dry by a heater blower 6 which is controlled thermostatically by a temperature sensor switch 26. A pressure activated switch 27 is employed to stop operation of the processing operation if the storage bin reaches full capacity. An access door 36 is provided to give access to the sterilized dehydrated particle waste for removal from said storage bin.

Figure 13:
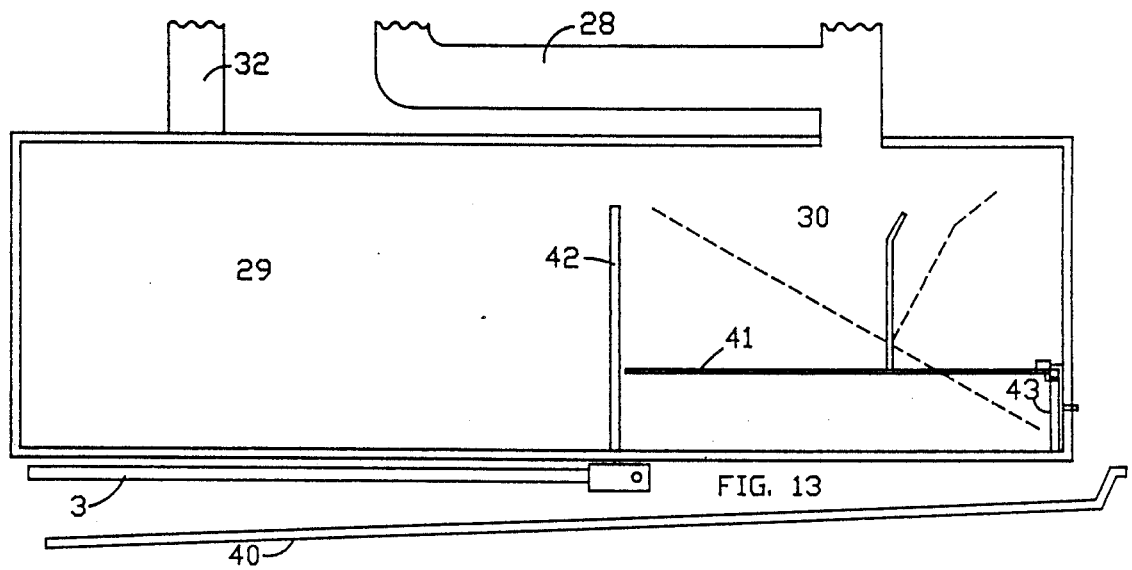
FIG. 13 is a schematic of the liquid-sludge tank of the side of the present invention.
Figure 14:
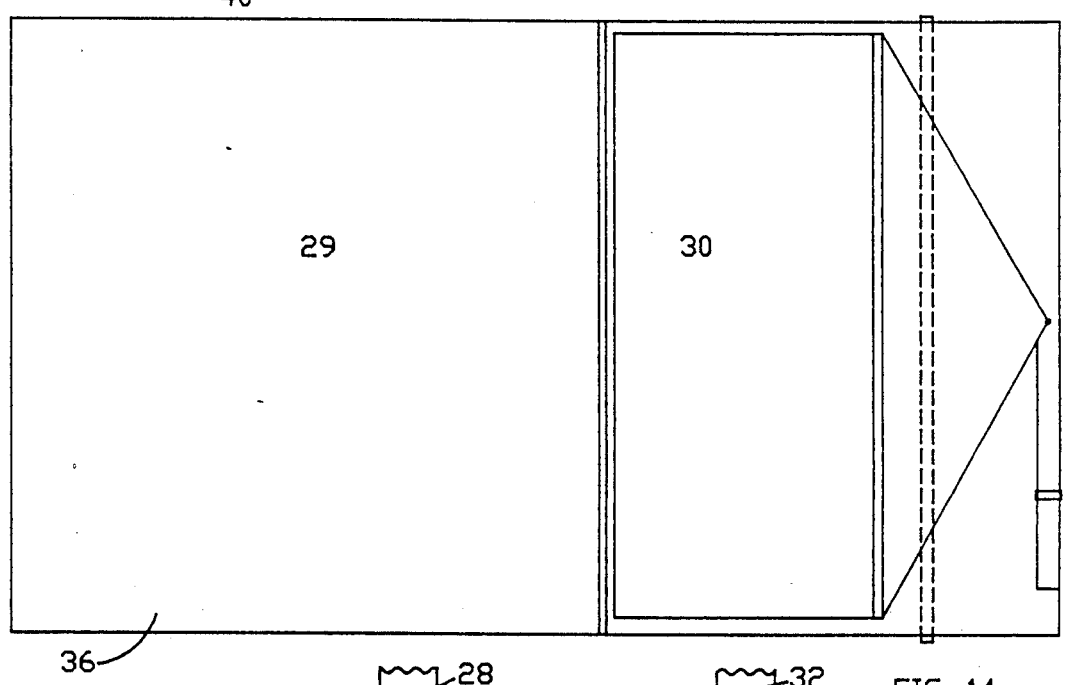
FIG. 14 is a plan schematic of the liquid-sludge tank of the present invention.
Figure 15:
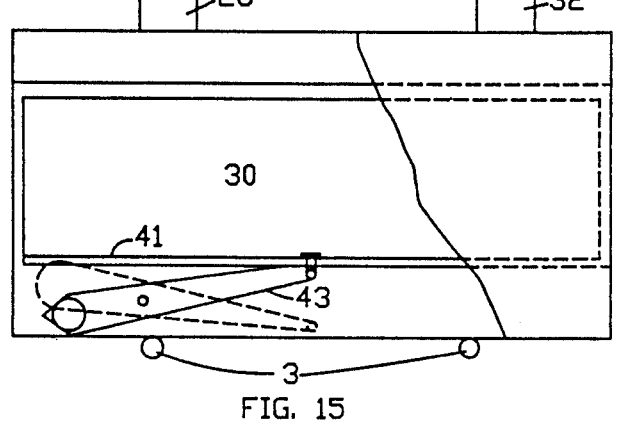
FIG. 15 is a schematic illustrating the side of the liquid-sludge tank of the present invention.

It should be noted that the liquid-sludge processing tank of storage bin is compartmentalized to be comprised of a sludge processing section and a liquid evaporation or drying section. The respective sections are partitioned by a tank section separator 42, see FIG. 13. As the liquid-sludge waste or sediment builds up in the sludge processing section, clear liquid flows over the tank section separator 42 and enters the liquid evaporation section. As sludge builds in the sludge processing section of the tank 30, it forces the valve plate 41 up thereby causing the drain valve 43 to open and allows the sludge to empty onto an evaporation plate 40 above the evaporation or drying section of the storage bin. As additional liquid-sludge waste enters the tank from inlet 28, the weight of the liquid falling on the valve plate causes the drain valve to close. Note that the dash lines shown in FIG. 15 represents the drain valve in the open position 41. The liquid that flows into the liquid-sludge processing tank via inlet 28 and over the tank section separator 42 represents liquid that was not completely vaporized in the heat chamber 20.

The housing 37 is fabricated of reinforced doubled walled sheet metal with insulation 38 intermediate said double walled structure. The structural steel framing plate 39 and the base support member 40 provide support for the assembly and whereas the circular doors 35 are removable to allow access to the assembly system for periodic maintenance.

An electrical service panel 2 is employed for electrical distribution and wiring distribution for the various electrical components and switches including main switch 1, wired in compliance with UL standards.

Since the toilet bowl is conventional and only modified to the extent necessary to accommodate the sewage disposal assembly, the appearance and use thereof is almost identical to that of a present day conventional water toilets and has the added advantage of using less water, since water is used only to provide a pulsatory rinse against the toilet bowl wall to clean the same.

From the foregoing, it should be recognized that the sewage disposal system assembly disclosed herein is for the disposal of human waste and represents a substantial savings in water. It is apparent that the present invention employs a minimum of water and produces an end product that is useful, easy to handle, sterile and and dehydrated.

Moreover, since the system has the appearance of a conventional water closet and is, in fact, a modified conventional water closet in use and function, the system should find wide public acceptance.

Although this invention has been disclosed and illustrated with reference to a particular assembly, the principles involved are susceptible for use in other endeavors, e.g., the system can be used in the treatment of waste other than human waste, which is apparent to persons skilled in art. Accordingly, the invention is to be limited only as indicated by the scope of the appended claims.

What is claimed is:

1. A sewage waste disposal system for receiving liquid and solid waste comprising in combination:

a trapless toilet bowl, said toilet bowl having an upper rim therearound, a toilet seat and lid therefor and a gasket attached to the bottom of said seat and said lid whereby the bowl is air tight when the seat and lid are in a closed position to prevent air leakage when the system is not in use;

switch control means associated with said toilet bowl lid to activate the system;

hydraulic closer means for closing said toilet seat and lid when said toilet bowl is not in use;

pulsating water supply means associated with said toilet bowl to provide a pulsatory rinsing action for cleaning said toilet bowl;

a circular pipe containing a conventional toilet bowl attaching flange at one end and spring loaded air lock valve means therein and positioned intermediate said toilet bowl and a housed toilet sewage treatment unit;

said treatment unit characterized by a heat chamber for dehydration of said waste, a moving conveyor for conveying the waste therethrough, a first outlet in communication with a liquid-sludge processing tank and a second outlet in communication with an air exhaust system;

said heat chamber being in fluid communication with a thermostatically controlled hot air blower positioned at an entry end of said treatment unit and to a waste crushing element positioned at a waste outlet end thereof for receiving dehydrated solid waste therefrom;

a thermostatically controlled electric coil positioned below said heat chamber for heating the waste moving therethrough and a cylindrical heat guard concentric with and surrounding said heat chamber;

a waste storage bin for receiving dehydrated waste from said crushing element, said storage bin having therein a thermostat sensor switch to control a louvered hot air blower for maintaining the waste in a dry state; and a pressure switch for deactivating the disposal system when the storage bin reaches a given capacity and an access door for removal of said dehydrate waste.

2. A sewage waste disposal system as set forth in claim 1 wherein the crushing element comprises a plurality of rollers which, together, cooperate to crush the sewage waste.

3. A sewage waste disposal system as set forth in claim 2 wherein the waste is pulverized by the action of the cooperating rollers.

4. A sewage waste disposal system as set forth in claim 1 wherein the waste storage bin has associated therewith a heating coil to ensure completion of the drying of the sewage waste.

5. A sewage waste disposal system as set forth in claim 1 wherein the waste storage bin is compartmentalized to include a liquid-sludge processing section and a drying section.

6. A sewage waste disposal system as set forth in claim 5 wherein the heating coil is associated with the drying section of the waste storage bin to evaporate any liquid received from the liquid-sludge processing section.

7. A sewage waste disposal system as set forth in claim 5 wherein the liquid-sludge section and the drying section of the waste storage bin are separated by a section separator which permits liquid flow from said liquid-sludge processing section to said drying section.

8. A sewage waste disposal system as set forth in claim 3 wherein the waste received by the cooperating rollers is pulvarized into particle form.

9. A sewage waste disposal system as set forth in claim 2 wherein the rollers are powered by an electric motor.

10. A sewage waste disposal system as set forth in claim 1 wherein the moving conveyor is a belt powered by an electric motor with a step down pulley reduction assembly intermediate said motor and said belt.

11. A sewage waste disposal system as set forth in claim 10 wherein the rollers and the moving conveyor are powered by the same motor and the moving conveyor travels at a ratio of 1:20 with respect to the speed of the motor.

* * * * *